(12) United States Patent
Kruglick

(10) Patent No.: US 9,847,987 B2
(45) Date of Patent: *Dec. 19, 2017

(54) DATA CENTER ACCESS AND MANAGEMENT SETTINGS TRANSFER

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/943,947

(22) Filed: Nov. 17, 2015

(65) Prior Publication Data

US 2016/0072791 A1    Mar. 10, 2016

Related U.S. Application Data

(63) Continuation of application No. 13/579,131, filed as application No. PCT/US2012/033145 on Apr. 11, 2012, now Pat. No. 9,231,987.

(51) Int. Cl.
*H04L 29/06* (2006.01)
*H04L 12/24* (2006.01)

(52) U.S. Cl.
CPC .......... *H04L 63/08* (2013.01); *H04L 41/28* (2013.01); *H04L 63/10* (2013.01); *H04L 65/1076* (2013.01); *H04L 63/0272* (2013.01)

(58) Field of Classification Search
CPC ............................... H04L 63/08; H04L 41/28
USPC ....................................................... 709/225
See application file for complete search history.

(56) References Cited

U.S. PATENT DOCUMENTS

| | | | |
|---|---|---|---|
| 6,064,656 A | 5/2000 | Angal et al. | |
| 6,408,336 B1 | 6/2002 | Schneider et al. | |
| 6,643,774 B1* | 11/2003 | McGarvey | H04L 63/0823 380/259 |
| 7,168,094 B1 | 1/2007 | Fredell | |
| 7,281,263 B1 | 10/2007 | LaMastres et al. | |
| 7,392,535 B2 | 6/2008 | Horikiri | |
| 7,656,870 B2 | 2/2010 | Ravikumar et al. | |
| 7,818,414 B2 | 10/2010 | Kennedy | |
| 2002/0162005 A1 | 10/2002 | Ueda et al. | |
| 2003/0110397 A1 | 6/2003 | Supramaniam et al. | |
| 2003/0192039 A1 | 10/2003 | McConnell | |

(Continued)

FOREIGN PATENT DOCUMENTS

| CN | 101149667 A | 3/2008 |
|---|---|---|
| CN | 101281461 A | 10/2008 |

(Continued)

OTHER PUBLICATIONS

"The Identity and Access Management Imperative: Securing the Extended Enterprise," White Paper Security Solutions, Verizon, 2010, pp. 5.

(Continued)

*Primary Examiner* — Brian J Gillis
*Assistant Examiner* — Steve Lin
(74) *Attorney, Agent, or Firm* — Brundidge & Stanger, P.C.

(57) ABSTRACT

Technologies and implementations for providing a data center access and management settings transfer service are generally disclosed.

16 Claims, 5 Drawing Sheets

(56) References Cited

U.S. PATENT DOCUMENTS

| | | | |
|---|---|---|---|
| 2004/0153560 A1* | 8/2004 | Masuhiro | H04L 41/26 709/229 |
| 2005/0286519 A1 | 12/2005 | Ravikumar et al. | |
| 2006/0190995 A1 | 8/2006 | Horikiri | |
| 2007/0055674 A1* | 3/2007 | Sunada | G06F 17/30011 |
| 2007/0083917 A1* | 4/2007 | Peterson | G06F 21/31 726/5 |
| 2008/0270515 A1 | 10/2008 | Chen et al. | |
| 2009/0292915 A1 | 11/2009 | Sakane | |
| 2010/0082741 A1 | 4/2010 | Kawada | |
| 2010/0250313 A1 | 9/2010 | Crocker et al. | |
| 2010/0251329 A1 | 9/2010 | Wei | |
| 2011/0010708 A1 | 1/2011 | Lassonde et al. | |
| 2011/0093941 A1 | 4/2011 | Liu et al. | |
| 2012/0124168 A1 | 5/2012 | Boerger et al. | |
| 2013/0239172 A1 | 9/2013 | Murakami et al. | |
| 2013/0347129 A1* | 12/2013 | Samuelsson | H04L 9/321 726/28 |
| 2014/0007085 A1 | 1/2014 | Campion et al. | |

FOREIGN PATENT DOCUMENTS

| | | |
|---|---|---|
| CN | 101426220 A | 5/2009 |
| EP | 1617320 A2 | 1/2006 |

OTHER PUBLICATIONS

International search report and written opinion for International Application No. PCT/US2012/033145, dated Jun. 22, 2012.

Samovskiy, D., "Security Groups Most Underappreciated Feature of Amazon EC2," accessed at http://web.archive.org/web/20120303092905/http://www.somic.org/2009/09/21/security-groups-most-underappreciated-feature-of-amazon-ec2/, Sep. 21, 2009, pp. 3.

* cited by examiner

500 A computer program product

502 A signal bearing medium

504 Machine-readable instructions that, when executed, cause a computer to provide a data center access and management settings transfer service by:

transmitting one or more user logins and one or more access requests for each of the one or more user logins to an origin data center;

receiving one or more access results related to the one or more access requests for each of the one or more user logins from the origin data center;

utilizing the one or more access results, the related one or more access requests, and the related one or more user logins to provide access and management settings at a destination data center;

utilizing a default setting for a first user login having no data for a first access result;

mapping the one or more access results, the related one or more access requests, and the related one or more user logins having an origin center data format to a destination data center format different than the origin center data format;

transmitting a request to begin a test action, wherein a first access request of the one or more access requests is a terminate request for the test action and a first access result related to the first access request is determined based on whether the terminate request was successful;

transmitting a stop terminate request upon detecting a termination start, wherein a first access request of the one or more access requests is a termination start request configured to provide the termination start;

transmitting a user online request for a first user login of the one or more user logins;

receiving an indication of whether the first user is online;

if the first user is online, delaying transmitting the one or more access requests related to the first user login;

transmitting one or more user notifications indicating a valid account access for the one or more user logins; or storing the one or more access results, the related one or more access requests, and the related one or more user logins in an access and management settings database having a tree structure.

| 506 a computer-readable medium | 508 a recordable medium | 510 a communications medium |

Fig. 5

DATA CENTER ACCESS AND MANAGEMENT SETTINGS TRANSFER

CROSS-REFERENCE TO RELATED APPLICATIONS

This application is a continuation under 35 U.S.C. §120 of U.S. patent application Ser. No. 13/579,131, filed on Aug. 25, 2012, now U.S. Pat. No. 9,231,987, entitled "DATA CENTER ACCESS AND MANAGEMENT SETTINGS TRANSFER," which is a U.S. National Stage filing under 35 U.S.C. §371 of International Application No. PCT/US12/33145, filed on Apr. 11, 2012. The entire disclosures of U.S. patent application Ser. No. 13/579,131 and International Application No. PCT/US12/33145 are incorporated by reference herein.

BACKGROUND

Unless otherwise indicated herein, the approaches described in this section are not prior art to the claims in this application and are not admitted to be prior art by inclusion in this section.

Currently, when a customer moves from one data center to another data center, the customer spends time and effort to set up access and management settings at the new data center. Such time and effort may be prohibitive to customers making such data center moves.

SUMMARY

The present disclosure describes various example methods for providing a data center access and management settings transfer service. Example methods may include transmitting one or more user logins and one or more access requests for each of the one or more user logins to an origin data center, receiving one or more access results related to the one or more access requests for each of the one or more user logins from the origin data center, and utilizing the one or more access results, the related one or more access requests, and the related one or more user logins to provide access and management settings at a destination data center.

The present disclosure also describes various example machine readable non-transitory medium having stored therein instructions that, when executed, cause a device to provide a data center access and management settings transfer service. Example machine readable non-transitory media may have stored therein instructions that, when executed, cause the device to provide a data center access and management settings transfer service by transmitting one or more user logins and one or more access requests for each of the one or more user logins to an origin data center, receiving one or more access results related to the one or more access requests for each of the one or more user logins from the origin data center, and utilizing the one or more access results, the related one or more access requests, and the related one or more user logins to provide access and management settings at a destination data center.

The present disclosure additionally describes example devices. Example devices may include a processor and a machine readable medium having stored therein instructions that, when executed, cause the device to provide a data center access and management settings transfer service by transmitting one or more user logins and one or more access requests for each of the one or more user logins to an origin data center, receiving one or more access results related to the one or more access requests for each of the one or more user logins from the origin data center, and utilizing the one or more access results, the related one or more access requests, and the related one or more user logins to provide access and management settings at a destination data center.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 is an illustration of an example computer program product; and

DETAILED DESCRIPTION

Figure 1:
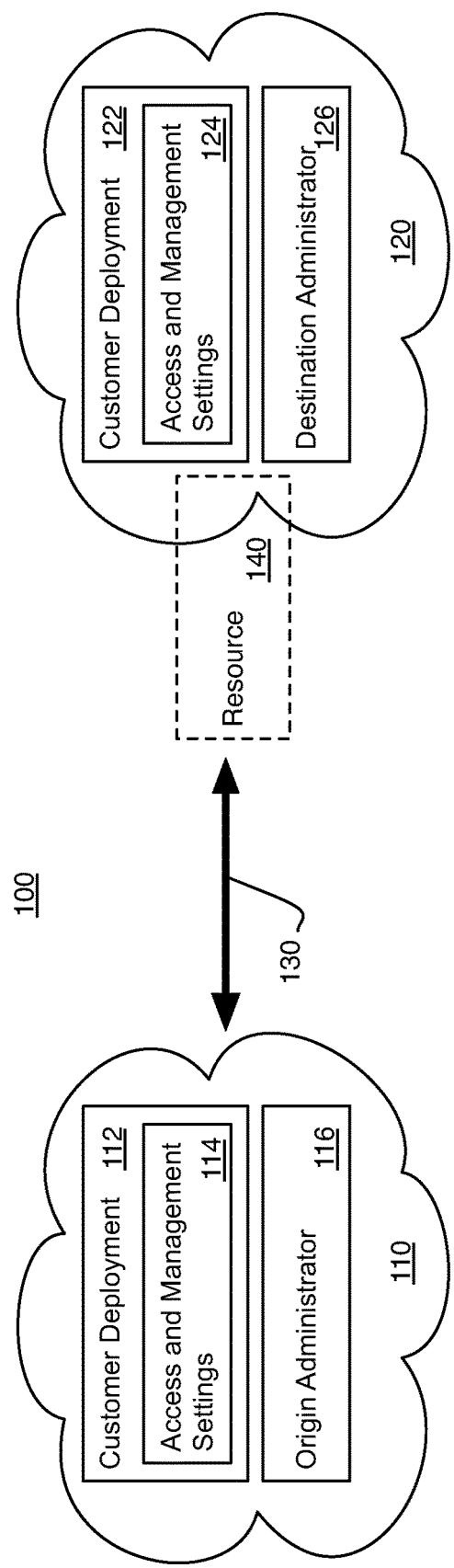
FIG. 1 is an illustration of a block diagram of an example system for providing a data center access and management settings transfer service.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing data center access and management settings transfer services.

In general, a data center implementation for a data center customer may include access and management settings that define, for employees of the data center customer or other related entities, privileges relative to data center elements. Datacenter elements may include, for example, programs, databases, disk images, or the like. Privileges may include, for example, the ability to access or run an element, the ability to modify an element, the ability to delete or create an element, or the like. In general, a data center implementation may include hundreds or thousands of employees or other entities and similar numbers of datacenter elements. Some of employees or other entities may have administrative access such that they may access disk images, modify programs, or even access the access and management settings. Other employees or other entities may have more limited access such that they may only run available programs, read data, or access data center services, such as executing queries, for example. The employees or other entities may have different privileges relative to the elements in the data center implementation.

As will be appreciated, when a data center customer moves from one data center to another, implementing access and management settings at the new or destination data center may be time consuming and difficult. In general, the embodiments discussed herein may provide for data center access and management settings transfer services such that, when a customer may desire to change to another data center, the transfer may be at least partially automated. In some examples, the transfer service may be provided at a destination data center. In other examples, the transfer service may be provided at a third party data center. In some examples, the origin data center may be accessed by a resource such as a virtual machine having access to the origin data center. In some examples, the resource may transmit user logins for the employees or other entities related to the customer implementation at the origin data center. For each user login, one or more access requests may be transmitted to the origin data center. In general, an access request may be a request to execute or run a program, access data, access other settings, or the like. In response to the access requests, access results may be received from the origin data center. In general, the access results may be used to determine the access and management settings of the origin data center. For example, the received access results, the related access requests, and the related user logins may be utilized to determine the access and management settings of the origin data center. The determined access and management settings may be subsequently implemented at the destination data center. Such techniques may provide an efficient and at least partially automated access and management settings transfer service for a data center customer.

As discussed, the techniques described herein may be used to transfer all or a portion of access and management settings from one data center to another data center. FIG. 1 is an illustration of a block diagram of an example system 100 for providing a data center access and management settings transfer service, arranged in accordance with at least some embodiments of the present disclosure. As shown, system 100 may include an origin data center 110 and a destination data center 120. Origin data center 110 may include a customer deployment 112 that may have access and management settings 114. Destination data center 120 may include a customer deployment 122 having access and management settings 124. As discussed herein, settings represented by access and management settings 114 may be transferred to access and management settings 124 using the techniques discussed herein.

As shown in FIG. 1, origin data center 110 and destination data center 120 may be in communication via a connection 130. Further, system 100 may include a resource 140. In some implementations, resource 140 may be configured to perform the transfer service discussed herein. In some examples, resource 140 may use connection 130, which in general can be any suitable communications connection, to perform the transfer service. In some examples, the connection 130 may include a virtual private network (VPN) tunnel, a management connection, or the like.

In general, origin data center 110 may include any suitable data center having access and management settings 114 for one or more customers. In some examples, origin data center 110 may include computers, servers, server systems, data storage systems, telecommunications systems, computing clusters, and/or ancillary environmental systems, or the like. In general, access and management settings 114 may be implemented at origin data center 110 using any suitable technique or techniques. In some examples, access and management settings 114 may be implemented as a database, or the like.

As shown, in some examples, access and management settings 114 may be implemented as a part of customer deployment 112, such that, access and management settings 114 pertinent to a customer may be stored within that customer's deployment 112 at origin data center 110. In some examples, access and management settings 114 may be stored as part of origin data center 110 in a manner such that they are not stored within the customer deployment 112. As will be appreciated, origin data center 110 may include any number of customer deployments 112 and/or access and management settings 114 for any number of customers serviced by the origin data center 110.

In general, access and management settings 114 may include any suitable information for implementing a data center service for a customer. In some examples, access and management settings 114 may include security permissions for users of the customer deployment 112 (e.g. employees or other entities) to applications, features, elements, controls, settings, or the like, applicable to the customer deployment 112. For example, some users, such as administrators, may have image level and setup changing access to hundreds or thousands of elements (e.g. applications or the like), while other users may only access services (e.g. execute queries or the like) at login.

In some examples, access and management settings 114 may include permissions related to individual logins. For example, some logins may be granted permission to launch applications or other services, while other logins may be granted permission to modify images, run programs on origin data center 110, or otherwise manage customer deployment 112 at origin data center 110. In some examples, access and management settings 114 may include permissions for different states of customer deployment 112. For example, various security permissions may be maintained for when data on customer deployment 112 is being backed up, when maintenance is being performed on origin data center 110 or on customer deployment 112, or the like. In some examples, origin data center 110 may also include an origin administrator 116.

In general, destination data center 120 may include any suitable data center that may provide data center services to a customer. In some examples, destination data center 120 may include computers, servers, server systems, data storage systems, telecommunications systems, computing clusters, and/or ancillary environmental systems, or the like. In general, as discussed herein, a customer may desire to move service from origin data center 110 to destination data center 120. In some examples, origin data center 110 and destination data center 120 may be data centers of competing data center service providers. In some examples, origin data center 110 and destination data center 120 may be data centers belonging to the same data center service provider, but access and management settings 114 may not easily be copied to access and management settings 124 due to a software version change, hardware incompatibility, or the like. In some examples, destination data center 120 may also include a destination administrator 126.

In general, resource 140 may include any suitable resource for providing a data center access and management settings transfer service as discussed herein. In some examples, resource 140 may include a computer, a multiple number of computers, a server, a computing resource, a virtual machine, or a computing cluster, or the like. In some examples, resource 140 may be a part of the destination data center 120. In some examples, resource 140 may be a virtual machine of destination data center 120. In some examples, resource 140 may be provided apart from destination data center 120. In such examples, resource 140 and destination data center 120 may be communicatively coupled using any suitable technique or techniques. In some examples, resource 140 may be provided by a third party to perform the techniques discussed herein as a service.

Having described example system 100 including origin data center 110 and destination data center 120 represented in FIG. 1, illustrative access and management settings transfer services may now be described. As detailed above, when a customer desires to transfer service from one data center to another data center, certain access and management settings may generally need to be recreated at the new or destination data center. As such, various implementations of the present disclosure may be provided to transfer all or a portion of these access and management settings from the origin data center to the destination data center, so that the customer may not need to manually recreate the settings. In some examples, the transferred access and management settings may include cloud control panel settings that may be accessed via a control panel presented at origin data center 110. For example, some or all of access and management settings 114 may be transferred to access and management settings 124 according to various implementations detailed herein.

Figure 2:
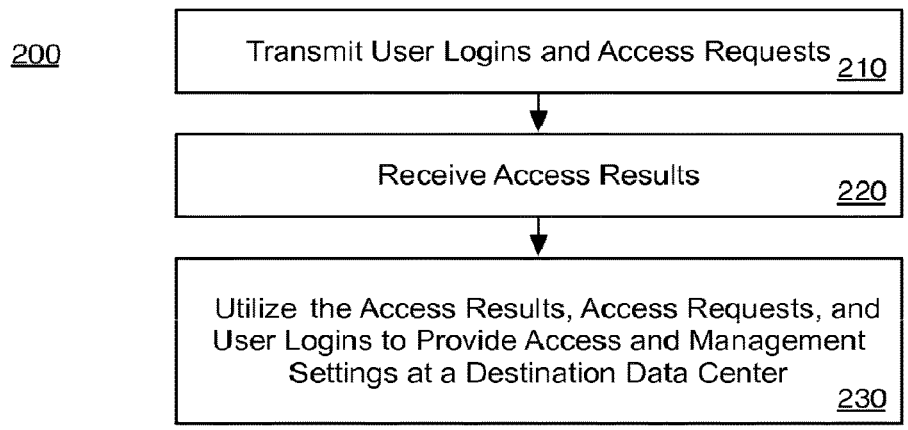
FIG. 2 is an illustration of a flow diagram of an example method for providing a data center access and management settings transfer service.
Figure 3:
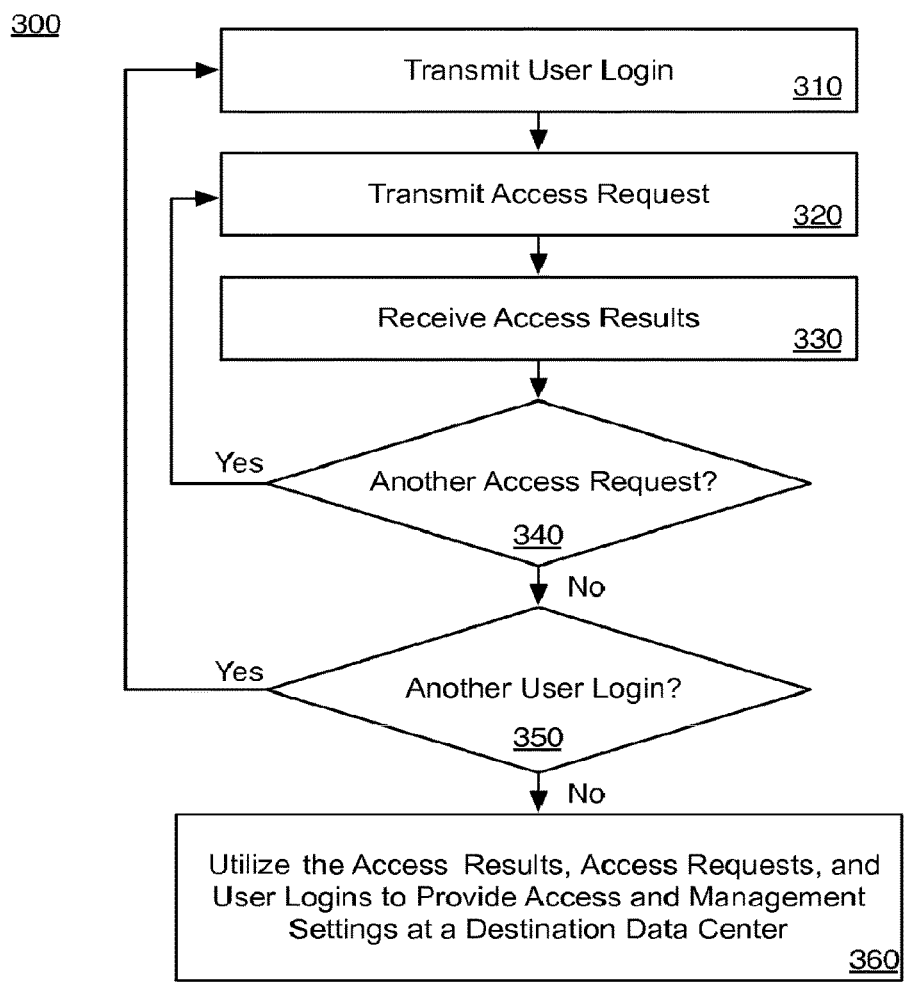
FIG. 3 is an illustration of a flow diagram of an example method for providing a data center access and management settings transfer service.
Figure 4:
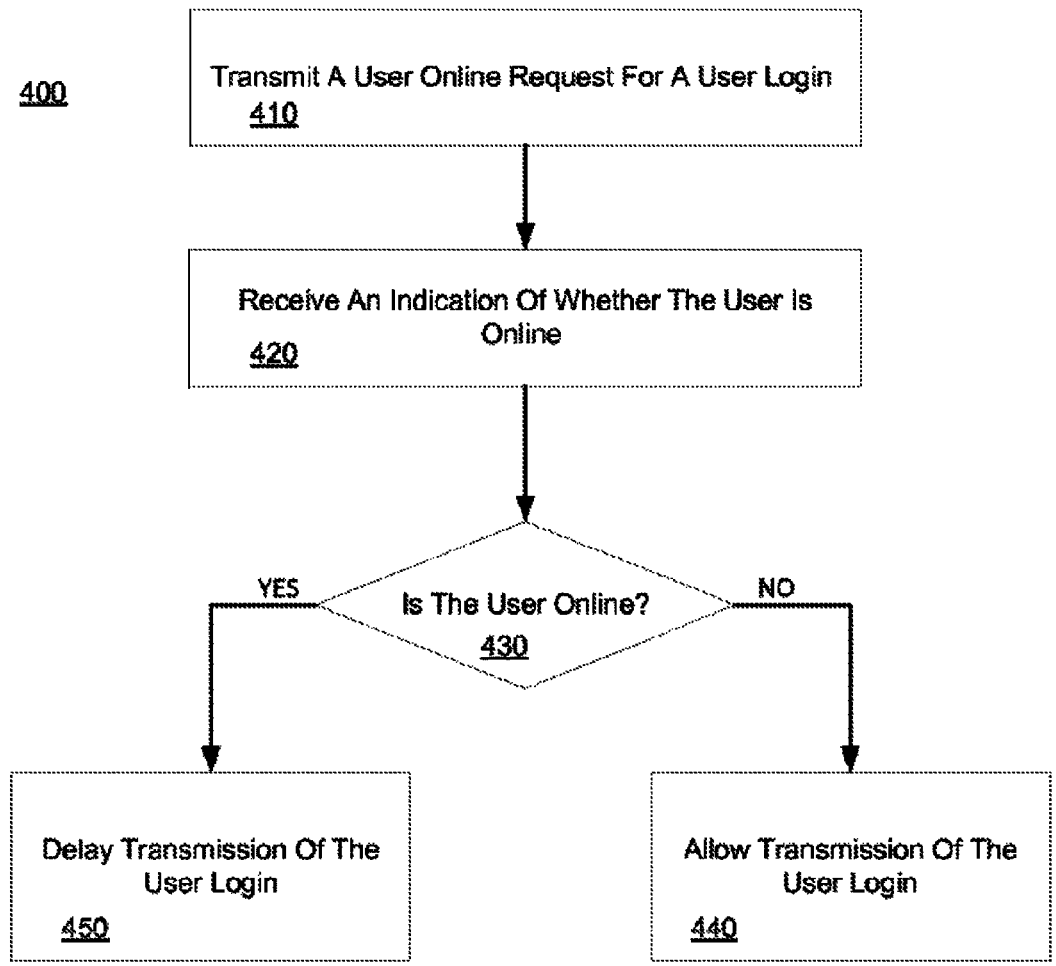
FIG. 4 is an illustration of a flow diagram of an example method for transmitting a user login to an origin data center.

Some illustrative methods for performing access and management settings transfer services may be detailed with respect to FIGS. 2, 3 and 4. These figures may employ block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of claimed subject matter.

FIG. 2 illustrates a flow diagram of an example method 200 for providing a data center access and management settings transfer service, arranged in accordance with at least some embodiments of the present disclosure. As indicated, in some implementations, method 200 may be utilized to transfer access and management settings 114 from origin data center 110 to access and management settings 124 in destination data center 120. In general, method 200 may be utilized to transmit one or more user logins and one or more access requests for each of the one or more user logins to origin data center 110 at block 210, receive one or more access results related to the one or more access requests for each of the one or more user logins from the origin data center 110 at block 220, and utilize the one or more access results, the related one or more access requests, and the related one or more user logins to provide access and management settings at destination data center 120 at block 230. Accordingly, access and management settings 114 may be transferred from origin data center 110 to access and management settings 124 at destination data center 120.

Method 200 may begin at block 210. At block 210, "Transmit User Logins and Access Requests", one or more user logins and one or more access requests for each of the user logins may be transmitted to origin data center 110. In general, the user logins and access requests may be transmitted using any suitable technique or techniques. In some examples, the user logins and access requests may be transmitted iteratively as is discussed further herein, and, in particular, with respect to FIG. 3. In some examples, the user logins and access requests may be transmitted in parallel.

As discussed, a communicative connection (e.g., connection 130) may be made with origin data center 110 and the user logins and access requests may be transmitted over the communicative connection. In some examples, the user logins and access requests may be transmitted over the connection 130 at block 210. In some examples, the communicative connection may include a virtual private network (VPN) tunnel. In some examples, the communicative connection may include a management connection. In some examples, the user logins and access requests may be transmitted over a virtual private network (VPN) tunnel such that the access requests may appear to be coming from the customer of customer deployment 112. In general, the user logins and the access requests may be transmitted from or on behalf of a device and/or customer having a privilege or an access to the one or more user logins and/or one or more access requests. In some examples, the user logins and access requests may be transmitted from or on behalf of a device and/or customer having super user access to the origin data center, such as, for example, the origin administrator 116.

The user logins may, in general, include any suitable information that identifies a user or other entity that may have access and management settings at the origin data center. In some examples, the user logins may include a textual username identifying a user or other entity. In further examples, the user logins may also include a textual authentication string, such as, a password associated with the username. As discussed, in some examples, a password may not be required as the accessing device may have super user access to the origin data center.

In general, the access requests may include any suitable information that identifies an access request. For example, an access request may identify a particular service at the origin data center to access, a management setting or settings at the origin data center, or the like. In some examples, the access requests may include an application access request, a web page access request, a settings tab access request, a control tab access request, an application start request, a configuration edit request, a settings module access request, a settings access request, a terminate request, an add or replace text request for a settings text box, a menu access request for a drop down settings menu, or a use log access request, or the like.

As indicated, method 200 may continue at block 220. At block 220, "Receive Access Results", one or more access results related to the one or more access requests for each of the one or more user logins may be received from origin data center 110. In general, the access results may include any suitable information related to the access requests and/or the user logins. In some examples, the access results may include an access rule, an access permission, an indication of access, an indication of no access, an indication of read access, an indication of write access, an indication of permission granted, an indication of permission denied, or the like. In some examples, the access result may include or may be based on a screen response, such as interpreting text. In some examples, the access results may include or be based on interpreting a log collected after some or all of the testing (i.e., transmitting logins and access requests).

In some Implementations, as stated above, one of the access requests may be a terminate request, such as, for example, a request to terminate a service executing within the customer deployment 112 on the origin data center 110. In further examples, a stop terminate request may be transmitted to the origin data center 110 if it is detected that the terminate request has started. The access results then may include whether the terminate request was started or not. In some examples, the access request may include a start request for a test action and a terminate request for the test action. The access results then may include whether the termination of the test action was successful.

As detailed, method 200 may further continue at block 230. At block 230, "Utilize the Access Results, Access Requests, and User Logins to Provide Access and Management Settings at a Destination Data Center", the one or more access results, the related one or more access requests, and the related one or more user logins may be utilized to provide access and management settings at a destination data center 120. In general, the access results, the access requests, and the user logins may be utilized to provide access and management settings at a destination data center using any suitable technique or techniques. In some examples, the access results, the access requests, and the user logins may be correlated in a data structure such as a database or the like.

Method 200 may be performed by any suitable device, devices, system, resource, or groups of resources as discussed herein. In some examples, method 200 may be performed by resource 140. In some examples, method 200 may be performed by a virtual machine, a data center cluster, a third party computing device, or the like. In some examples, method 200 may be performed by a virtual machine of destination data center 120. In some examples, method 200 may be performed by a third party resource.

As discussed, in some examples, the user logins and the access requests may be transmitted from destination data center 120 and the access results may be received at destination data center 120. In such examples, the access results, the access requests, and the user logins may be utilized to provide access and management settings at destination data center 120. In some examples, the user logins and the access requests may be transmitted from a resource separate from the destination data center (e.g., resource 140) and the access results may be received at a resource separate from the destination data center (e.g., resource 140). In such examples, the access results, the access requests, and the user log ins may be transmitted to destination data center 120 to be utilized as access and management settings at destination data center 120. For example, resource 140 may transmit the access results, the access request, and the user logins to destination data center 120.

In some examples, the access results, the access requests, and the user logins may be stored in a database. In some examples, the access results, the access requests, and the user logins may be stored in a database having a tree structure. In some examples, a database of the access results, the access requests, and the user logins may be transmitted to destination data center 120. In some examples, a database of the access results, the access requests, and the user logins may be stored and used at destination data center 120 to provide access and management settings 124.

In general, access and management settings at origin data center 110 and at destination data center 120 may have any suitable format. In some examples, origin data center 110 and destination data center 120 may have the same formats. In some examples, origin data center 110 and destination data center 120 may have different formats. In such examples, access and management settings, such as the access results, the access requests, and the user logins retrieved from the origin data center 110 using the techniques discussed herein may require reformatting to be useable at destination data center 120. In some examples, the one or more access results, the related one or more access requests, and the related one or more user logins having an origin center data format may be mapped to a destination data center format different than the origin data center format. In some examples, the one or more access results, the related one or more access requests, and the related one or more user logins may be mapped from the origin data center format to the destination data center format.

As described, FIG. 2 illustrates method 200 for providing data center access and management settings transfer services. In some implementations, the user logins, the related access requests, and the corresponding access results may be transmitted to, and received from, origin data center 110 iteratively. FIG. 3 is an illustration of a flow diagram of an example method for providing a data center access and management settings transfer service. In general, method 300 may provide for iteratively transmitting user logins and access requests to a data center and iteratively receiving corresponding access results.

In general, method 300 may be utilized to transmit a user login to origin data center 110 at block 310, transmit an access request associated with the user login to origin data center 110 at block 320, and receive corresponding access results from origin data center 110 at block 330. As can be seen from this figure, block 320 and block 330 may be repeated as part of the method 300. As such, additional associated access requests may be transmitted and corresponding access results received as blocks 320 and 330 may be repeated. Furthermore, FIG. 3 illustrates that block 310 may be repeated. Accordingly, another user login may be transmitted to the origin data center 110 as block 310 may be repeated. Then, access requests and associated access results may be transmitted and received at block 320 and block 330 as described above. As can be seen, user logins, access request and associated access results may be transmitted to and received from the origin data center 110 in an iterative fashion as described above. The user logins, access requests, and associated access results may then be used to provide access and management settings at a destination data center. As such, a data center access and management settings transfer service may be provided.

The various blocks detailed in FIG. 3 and introduced above are further described in detail below. It is to be appreciated, as stated above, that FIG. 3 is described with reference to FIG. 1 for purposes of clarity and the present disclosure and the claimed subject matter are not to be limited by the reference to FIG. 1. Furthermore, numerous alternatives to the functional blocks detailed herein may be practiced in various implementations and rearrangements, substitutions, changes, modifications, etc., may be made without departing from the scope of claimed subject matter.

As indicated, method 300 may begin at block 310. At block 310, "Transmit User Login", a user login may be transmitted to origin data center 110. In general, the user logins and access requests may be transmitted using any suitable technique or techniques. For example, a communicative connection (e.g., connection 130) may be made with origin data center 110 and the user logins and access requests may be transmitted over the communicative connection. In some examples, the communicative connection may include a virtual private network (VPN) tunnel. In some examples, the communicative connection may include a management connection. In general, the user logins and the access requests may be transmitted from or on behalf of a device and/or customer having a privilege or an access to the one or more user logins and/or one or more access requests. In some examples, the user logins and access requests may be transmitted from or on behalf of a device and/or customer having super user access to the origin data center, such as, for example, origin administrator 116.

The user logins may, in general, include any suitable information that identifies a user or other entity that may have access and management settings 114 at origin data center 110. In some examples, the user logins may include a textual username identifying a user or other entity. In further examples, the user logins may also include a textual authentication string, such as, a password associated with the username. As discussed, in some examples, a password may not be required as the accessing device may have super user access to the origin data center.

The process of method 300 may continue at block 320. At block 320, "Transmit Access Request", an access request may be transmitted to origin data center 110. In some examples, the access request may be transmitted over the same communicative structure established as part of process block 310. In other examples, another or additional communicative connection (e.g., connection 130) may be made with origin data center 110 and the access request may be transmitted over the other communicative connection. In some examples, the communicative connection may include a virtual private network (VPN) tunnel. In some examples, the communicative connection may include a management connection. In some examples, the access requests may be transmitted over a virtual private network (VPN) tunnel such that the access requests may appear to be coming from the customer of the customer deployment. In general, the access request may be transmitted from or on behalf of a device and/or customer having a privilege or an access to the one or more user logins and/or one or more access requests. In some examples, the access request may be transmitted from or on behalf of a device and/or customer having super user access to the origin data center, such as, for example, origin administrator 116.

In general, the access request may include any suitable information that may identify an access request. For example, an access request may identify a particular service at origin data center 110 in which to access, a management setting or settings at origin data center 110, or the like. In some examples, the access request may include an application access request, a web page access request, a settings tab access request, a control tab access request, an application start request, a configuration edit request, a settings module access request, a settings access request, a terminate request, an add or replace text request for a settings text box, a menu access request for a drop down settings menu, or a use log access request, or the like.

In some Implementations, as stated above, one of the access requests may be a terminate requests, such as, for example, a request to terminate a service executing on origin data center 110 (e.g., within customer deployment 112). In further examples, a stop terminate request may be transmitted to origin data center 110 if it is detected that the terminate request has started. The access results then may include whether the terminate request was started or not. In some examples, the access request may include a start request for a test action and a terminate request for the test action. The access results then may include whether the start and/or termination of the test action was successful.

As indicated, once a user login and access request are transmitted to the origin data center (e.g. at block 310 and at block 320,) one or more access results related to the access request for the user login may be received from the origin data center 110 at block 330, "Receive Access Results". In general, the access results may include any suitable information related to the access request and/or the user login. In some examples, the access results may include an access rule, an access permission, an indication of access, an indication of no access, an indication of read access, an indication of write access, an indication of permission granted, an indication of permission denied, or the like. In some examples, the access result may include or may be based on a screen response, such as interpreting text. In some examples, the access results may include or be based on interpreting a log collected after some or all of the testing (i.e., transmitting logins and access requests).

Subsequently, additional access requests and associated access results may be transmitted to and received from the origin data center as block 320 and block 330 may be repeated. As shown in FIG. 3, the process of method 300 may include decision block 340, "Another Access Request?". Accordingly, if an additional access request is to be transmitted to the origin data center 110 for the user login transmitted at block 310, method 300 may return to block 320 and another access request may be transmitted. Method 300 may continue at block 330 as described above. In some examples, additional access requests may be transmitted to origin data center 110, and associated access results may be received from origin data center 110 until no further access requests are to be transmitted to the origin data center 110.

If another access request is not to be transmitted to the origin data center, an additional user login may be transmitted to origin data center 110 as detailed above. As can be seen from this figure, the process of method 300 may include decision block 350, "Another User Login?". Accordingly, if another user login is to be transmitted to origin data center 110, method 300 may return to block 310. As such, another user login may be transmitted to origin data center 110 at block 310, and method 300 may continue at process block 320, process block 330, and decision block 340, as detailed above.

Accordingly, user logins may be transmitted to origin data center 110 by iteratively repeating process block 310. Additionally, for each iteration of process block 310, access requests associated with the user login may be transmitted to origin data center 110 and associated access results received from origin data center 110, by iteratively repeating process blocks 320 and 330.

Returning to decision block 350, if another user login is not to be transmitted to the origin data center 110, the process of method 300 may continue at block 360. At block 360, "Utilize the Access Results, Access Requests, and User Logins to Provide Access and Management Settings at a Destination Data Center", the one or more access results, the related one or more access requests, and the related one or more user logins may be utilized to provide access and management settings at destination data center 120 as detailed above.

Method 300 may be performed by any suitable device, devices, system, resource, or groups of resources as discussed herein. In some examples, method 300 may be performed by resource 140. In some examples, method 300 may be performed by a virtual machine, a data center cluster, a third party computing device, or the like. In some examples, method 300 may be performed by a virtual machine of destination data center 120. In some examples, method 300 may be performed by a third party resource.

Various illustrative access and management settings transfer services have been described above with respect to FIGS. 2 and 3. As detailed, user logins may be transmitted to an origin data center, such as, for example, origin data center 110. FIG. 4 is an illustration of a flow diagram of a method 400 for transmitting a user login to an origin data center, arranged in accordance with some implementations of the present disclosure. In some examples, method 400 may be performed as part of method 200 or method 300, such as, for example, at block 210 or 310. In general, method 400 may transmit a user online request for a user login to origin data center 110 at block 410. An indication of whether the user is online or not may be received from the origin data center at block 420. Then, if the user is not online (e.g., at block 430), the user login may be allowed to be transmitted to origin data center 110 at block 440. Alternatively, if the user is online, the transmission of the user login to the origin data center 110 may be delayed at block 450. As such, only user logins for users that are not already logged into the origin data center 110 may be transmitted to the origin data center 110.

The various blocks detailed in FIG. 4 and introduced above are further described in detail below. It is to be appreciated, as stated above, that FIG. 4 is described with reference to FIG. 1 for purposes of clarity and the present disclosure and the claimed subject matter are not to be limited by the reference to FIG. 1. Furthermore, numerous alternatives to the functional blocks detailed herein may be practiced in various implementations and rearrangements, substitutions, changes, modifications, etc., may be made without departing from the scope of claimed subject matter.

In general, method 400 may be performed by any suitable device, devices, system, resource, or groups of resources as discussed herein. In some examples, method 400 may be performed by resource 140. In some examples, method 400 may be performed by a virtual machine, a data center cluster, a third party computing device, or the like. In some examples, method 400 may be performed by a virtual machine of destination data center 120. In some examples, method 400 may be performed by a third party resource.

As detailed, a request to determine if a user corresponding to a particular user login is online may be transmitted to origin data center 110 at block 410, "Transmit A User Online Request For A User Login". In general, the request may be transmitted using any suitable technique or techniques. For example, a communicative connection (e.g., connection 130) may be utilized to transmit the request to origin data center 110. In some examples, the communicative connection may include a virtual private network (VPN) tunnel. In some examples, the communicative connection may include a management connection. In general, the user login may be transmitted from or on behalf of a device and/or customer having a privilege or an access to the one or more user logins and/or one or more access requests. In some examples, the user login may be transmitted from or on behalf of a device and/or customer having super user access to the origin data center.

As detailed, method 400 may continue at block 420. At block 420, "Receive An Indication Of Whether The User Is Online", an indication of whether the user corresponding to the user login may be received from the origin data center. In general, the indication may be the status of the user, such as, for example, online, offline, idle, active, or the like. Then, a check to see if the user is online may be performed at decision block 430, "Is The User Online?".

As indicated above, if the user is not online, method 400 may continue at block 440. At block 440, "Allow Transmission of the User Login", the user login may be allowed to be transmitted to origin data center 110 as detailed above. If the user is online, method 400 may continue at block 450. At block 450, "Delay Transmission Of The User Login", transmission of the user login may be delayed. In some example, the transmission may be delayed for a set amount of time. In some examples, the transmission may be delayed until the user is offline. For example, although not shown in FIG. 4, if the user is online, the method 400 may be delayed for a specified amount of time (e.g. by operation of block 450) and then the process of method 400 may return to block 410.

Method 400 may be performed by any suitable device, devices, system, resource, or groups of resources as discussed herein. In some examples, method 400 may be performed by resource 140. In some examples, method 400 may be performed by a virtual machine, a data center cluster, a third party computing device, or the like. In some examples, method 400 may be performed by a virtual machine of destination data center 120. In some examples, method 400 may be performed by a third party resource.

In general, the methods described with respect to FIGS. 2, 3 and 4 and elsewhere herein may be implemented as a computer program product, executable on any suitable computing system, or the like. For example, a computer program product for providing data center access and management settings transfer services may be provided. Example computer program products are described with respect to FIG. 5 and elsewhere herein.

FIG. 5 illustrates an example computer program product 500, arranged in accordance with at least some embodiments of the present disclosure. Computer program product 500 may include machine readable non-transitory medium having stored therein a plurality of instructions that, when executed, cause the machine to provide an access and management settings transfer service according to the processes and methods discussed herein. Computer program product 500 may include a signal bearing medium 502. Signal bearing medium 502 may include one or more machine-readable instructions 504, which, when executed by one or more processors, may operatively enable a computing device to provide the functionality described herein. In various examples, some or all of the machine-readable instructions may be used by the devices discussed herein.

In some examples, the machine readable instructions 504 may include transmitting one or more user logins and one or more access requests for each of the one or more user logins to an origin data center. In some examples, the machine readable instructions 504 may include receiving one or more access results related to the one or more access requests for each of the one or more user logins from the origin data center. In some examples, the machine readable instructions 504 may include utilizing the one or more access results, the related one or more access requests, and the related one or more user logins to provide access and management settings at a destination data center. In some examples, the machine readable instructions 504 may include utilizing a default setting for a first user login having no data for a first access result; mapping the one or more access results, the related one or more access requests, and the related one or more user logins having an origin center data format to a destination data center format different than the origin center data format. In some examples, the machine readable instructions 504 may include transmitting a request to begin a test action, wherein a first access request of the one or more access requests is a terminate request for the test action and a first access result related to the first access request is determined based on whether the terminate request was successful. In some examples, the machine readable instructions 504 may include transmitting a stop terminate request upon detecting a termination start, wherein a first access request of the one or more access requests is a termination start request configured to provide the termination start; transmitting a user online request for a first user login of the one or more user logins. In some examples, the machine readable instructions 504 may include receiving an indication of whether the first user is online. In some examples, the machine readable instructions 504 may include if the first user is online, delaying transmitting the one or more access requests related to the first user login. In some examples, the machine readable instructions 504 may include transmitting one or more user notifications indicating a valid account access for the one or more user logins. In some examples, the machine readable instructions 504 may include storing the one or more access results, the related one or more access requests, and the related one or more user logins in an access and management settings database having a tree structure.

In some implementations, signal bearing medium 502 may encompass a computer-readable medium 506, such as, but not limited to, a hard disk drive (HDD), a Compact Disc (CD), a Digital Versatile Disk (DVD), a digital tape, memory, etc. In some implementations, the signal bearing medium 502 may encompass a recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communication link, a wireless communication link, etc.). In some examples, the signal bearing medium 502 may encompass a machine readable non-transitory medium.

In general, the methods described with respect to FIGS. 2, 3 and 4 and elsewhere herein may be implemented in any suitable server and/or computing system. Example systems may be described with respect to FIG. 6 and elsewhere herein. In some examples, a resource, data center, data cluster, cloud computing environment, or other system as discussed herein may be implemented over multiple physical sites or locations. In general, the computer system may be configured to provide data center access and management settings transfer services.

Figure 6:
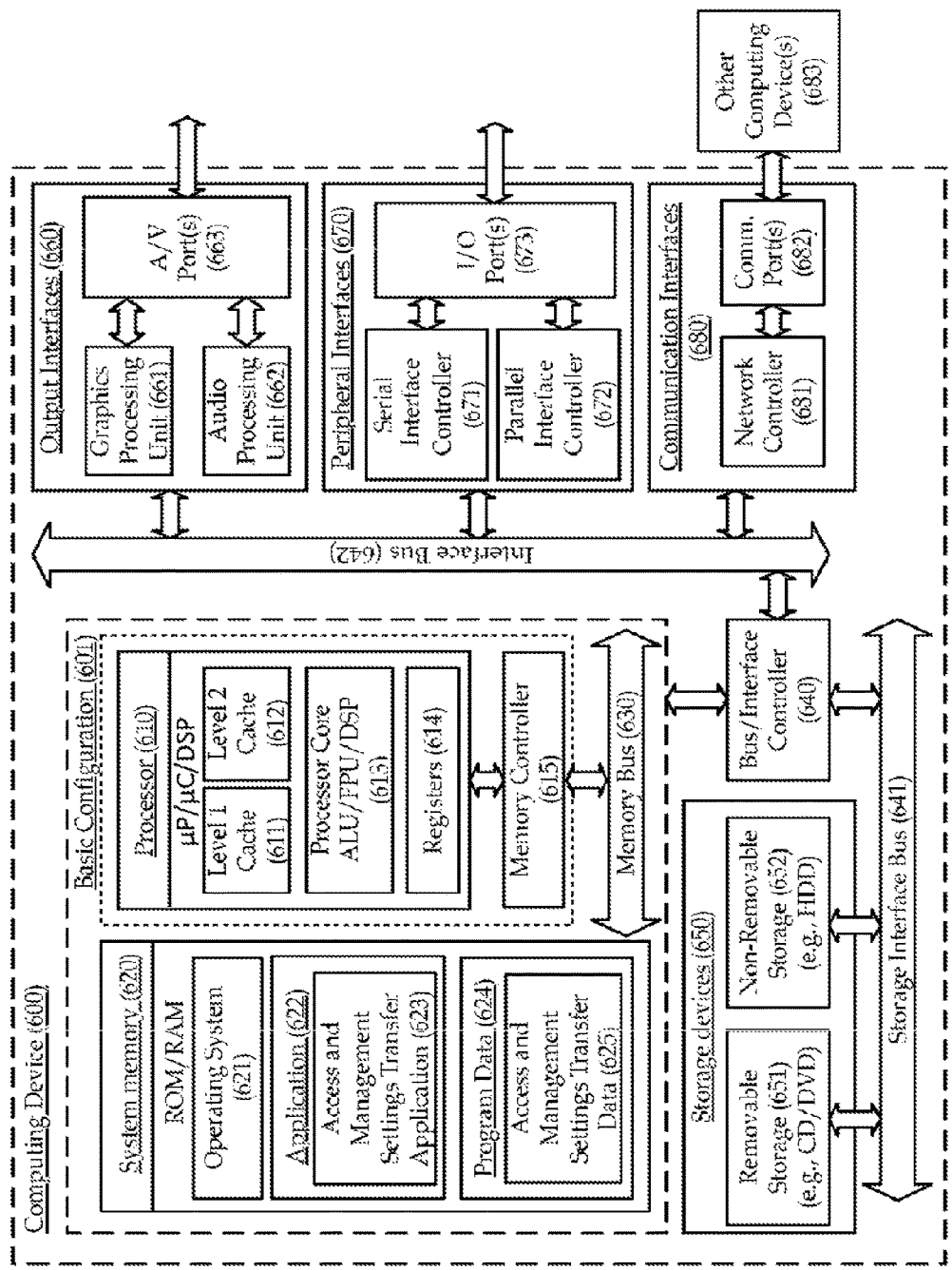
FIG. 6 is an illustration of a block diagram of an example computing device, all arranged in accordance with at least some embodiments of the present disclosure.

FIG. 6 is a block diagram illustrating an example computing device 600, arranged in accordance with at least some embodiments of the present disclosure. In various examples, computing device 600 may be configured to provide an access and management settings transfer service as discussed herein. In various examples, computing device 600 may be configured to provide an access and management settings transfer service as a server system or as a resource as discussed herein. In one example of a basic configuration 601, computing device 600 may include one or more processors 610 and a system memory 620. A memory bus 630 can be used for communicating between the one or more processors 610 and the system memory 620.

Depending on the desired configuration, the one or more processors 610 may be of any type including but not limited to a microprocessor (µP), a microcontroller (µC), a digital signal processor (DSP), or any combination thereof. The one or more processors 610 may include one or more levels of caching, such as a level one cache 611 and a level two cache 612, a processor core 613, and registers 614. The processor core 613 can include an arithmetic logic unit (ALU), a floating point unit (FPU), a digital signal processing core (DSP core), or any combination thereof. A memory controller 615 can also be used with the one or more processors 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory, etc.) or any combination thereof. The system memory 620 may include an operating system 621, one or more applications 622, and program data 624. The one or more applications 622 may include access and management settings transfer application 623 that can be arranged to perform the functions, actions, and/or operations as described herein including the functional blocks, actions, and/or operations described herein. The program data 624 may include access and management settings transfer data 625 for use with access and management settings transfer application 623. In some example embodiments, the one or more applications 622 may be arranged to operate with the program data 624 on the operating system 621. This described basic configuration 601 is illustrated in FIG. 6 by those components within dashed line.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The one or more data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 620, the removable storage 651 and the non-removable storage 652 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 683 over a network communication via one or more communication ports 682. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 600 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 600 may also be implemented as a personal computer including both laptop computer and non-laptop computer configurations. In addition, the computing device 600 may be implemented as part of a wireless base station or other wireless system or device. In some examples, the computing device 600 may be implemented as a cloud system. In some examples, the computing device 600 may be implemented as a datacenter or datacenter cluster, or the like. In some examples, the computing device 600 may be implemented as a cloud computing service. In some examples, the computing device 600 may be implemented as a virtual machine or a group of virtual machines. In some examples, the computing device 600 may be implemented as a collocated computing device or devices. In some examples, the computing device 600 may be implemented as an Infrastructure as a Service (IaaS) provider or a Platform as a Service (PaaS) provider, or the like.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method to manage datacenter access, the method comprising:
    receiving, by one or more servers at a first datacenter, a first access request associated with a user login and transmitted from a user device, wherein the first access request identifies a first service at a second datacenter;
    determining, by the one or more servers at the first datacenter, whether a user identity associated with the user login is logged into the second datacenter;
    transmitting, by the one or more servers at the first datacenter, the first access request associated with the user login to the second datacenter, in response to the user identity associated with the user login not being logged into the second datacenter;
    receiving, in response to the transmission of the first access request, by the one or more servers at the first datacenter, a first access result related to the user login and the first access request, wherein the first access result is received from the second datacenter;
    receiving, in response to the reception of the first access result, by the one or more servers at the first datacenter, a second access request associated with the user login and transmitted from the user device, wherein the second access request identifies a second service at the second datacenter;
    receiving, in response to the reception of the second access request, by the one or more servers at the first datacenter, a second access result related to the user login and the second access request, wherein the second access result is received from the second datacenter; and
    correlating in a data structure, by the one or more servers at the first datacenter, the user login, the first access request, the first access result, the second access request, and the second access result.

2. The method of claim 1, wherein the receiving the first access result by the first datacenter comprises receiving the first access result by at least one of a destination datacenter or a third party datacenter.

3. The method of claim 1, wherein the transmitting the first access request to the second datacenter includes transmitting the first access request to an origin datacenter.

4. The method of claim 1, further comprising using at least a part of the data structure to determine user access to one or more services at the first datacenter or a third datacenter.

5. The method of claim 1, wherein the first datacenter and the second datacenter comprise at least one of:
    datacenters of competing datacenter service providers; or
    datacenters that belong to a same datacenter service provider.

6. The method of claim 1, wherein the transmitting the first access request comprises transmitting at least one of:
    an application access request;
    a web page access request;
    a request to execute or run a program; or
    a request to access data.

7. The method of claim 1, wherein the receiving the first access result comprises receiving at least one of:
    an access permission related to the user login; or
    an access setting related to the user login.

8. The method of claim 1, wherein the receiving the first access result includes receiving an access permission, an access rule, an indication of access, an indication of no access, an indication of read access, an indication of write access, an indication of permission granted, or an indication of permission denied.

9. A computing device of a first datacenter, the computing device comprising:
    processor circuitry configured to:
        receive, at the first datacenter, a first access request associated with a user login and transmitted from a user device, wherein the first access request identifies a first service at a second datacenter;
        determine, at the first datacenter, whether a user identity associated with the user login is logged into the second datacenter;
        transmit, at the first datacenter, the first access request associated with the user login to the second datacenter, in response to the user identity associated with the user login not being logged into the second datacenter;
        receive, in response to the transmission of the first access request, at the first datacenter, a first access result related to the user login and the first access request, wherein the first access result is received from the second datacenter;
        receive, in response to the receipt of the first access result, at the first datacenter, a second access request associated with the user login and transmitted from the user device, wherein the second access request identifies a second service at the second datacenter;

receive, in response to the receipt of the second access request, at the first datacenter, a second access result related to the user login and the second access request, wherein the second access result is received from the second datacenter; and correlate in a data structure, at the first datacenter, the user login, the first access request, the first access result, the second access request and the second access result.

10. The computing device of claim 9, wherein the first datacenter comprises at least one of a destination datacenter or a third party datacenter.

11. The computing device of claim 9, wherein the second datacenter comprises an origin datacenter.

12. The computing device of claim 9, wherein at least a part of the data structure is used to determine user access to one or more services at the first datacenter or a third datacenter.

13. The computing device of claim 9, wherein the first datacenter and the second datacenter comprise at least one of:
- datacenters of competing datacenter service providers; or
- datacenters that belong to same datacenter service provider.

14. The computing device of claim 9, wherein the first access request comprises at least one of:
- an application access request;
- a web page access request;
- a request to execute or run a program; or
- a request to access data.

15. The computing device of claim 9, wherein the first access result comprises at least one of:
- an access permission related to the user login; or
- an access setting related to the user login.

16. The computing device of claim 9, wherein the first access result includes an access permission, an access rule, an indication of access, an indication of no access, an indication of read access, an indication of write access, an indication of permission granted, or an indication of permission denied.

\* \* \* \* \*